United States Patent [19]

Cannon

[11] Patent Number: 6,029,176

[45] Date of Patent: Feb. 22, 2000

[54] MANIPULATING AND ANALYZING DATA USING A COMPUTER SYSTEM HAVING A DATABASE MINING ENGINE RESIDES IN MEMORY

[75] Inventor: Mark E. Cannon, Provo, Utah

[73] Assignee: Cannon Holdings, L.L.C., Provo, Utah

[21] Appl. No.: 08/977,969

[22] Filed: Nov. 25, 1997

[51] Int. Cl.[7] .................................................... G06F 17/30
[52] U.S. Cl. ................................. 707/104; 707/1; 348/1; 348/13
[58] Field of Search .................................. 707/6, 1, 104; 348/2, 4, 1, 12, 7, 13, 460; 380/7; 455/4.2, 2; 364/188; 705/10, 14; 706/12

[56] References Cited

U.S. PATENT DOCUMENTS

| | | | |
|---|---|---|---|
| 4,012,132 | 3/1977 | Lazarus | 353/25 |
| 4,107,735 | 8/1978 | Frohboch | 348/13 |
| 4,546,382 | 10/1985 | McKenna et al. | 348/13 |
| 4,905,080 | 2/1990 | Watanabe et al. | 348/13 |
| 4,930,011 | 5/1990 | Kiewit | 348/2 |
| 5,223,924 | 6/1993 | Strubbe | 348/7 |
| 5,260,778 | 11/1993 | Kauffman et al. | 348/6 |
| 5,446,919 | 8/1995 | Wilkins | 455/62 |
| 5,515,098 | 5/1996 | Carles | 348/8 |
| 5,615,341 | 3/1997 | Agrawal et al. | 705/10 |
| 5,636,346 | 6/1997 | Saxe | 705/1 |
| 5,692,107 | 11/1997 | Simoudis et al. | 706/12 |
| 5,724,573 | 3/1998 | Agrawal et al. | 707/6 |
| 5,749,043 | 5/1998 | Worthy | 455/2 |
| 5,758,257 | 5/1998 | Herz et al. | 455/2 |
| 5,790,198 | 8/1998 | Roop et al. | 348/460 |
| 5,812,642 | 9/1998 | Leroy | 379/92.01 |
| 5,819,241 | 10/1998 | Reiter | 705/408 |
| 5,842,200 | 11/1998 | Agrawal et al. | 707/1 |
| 5,848,396 | 12/1998 | Gerace | 705/10 |
| 5,855,008 | 12/1998 | Goldhaber et al. | 705/14 |
| 5,867,386 | 2/1999 | Hoffberg et al. | 364/188 |
| 5,872,588 | 2/1999 | Aras et al. | 348/1 |
| 5,884,305 | 3/1999 | Kleinberg et al. | 707/6 |

OTHER PUBLICATIONS

Edelstein, Herb, DB2 Magazine, Summer 1998, vol. 3, No. 2, Miller Freeman A United News & Media Publication, pp. 36–40: "Data Mining—Let's Get Practical", 1998.

Saarenvirta, Gary, DB2 Magazine, Fall 1998, vol. 3, No. 3, Miller Freeman A United News & Media Publication, pp. 20–26 and pp. 28–30: "Mining Customer Data: A Step–by–Step Look At A Powerful Clustering and Segmentation Methodology", 1998.

Cipolla, Emil T., Enterprise Systems Journal, vol. 10, No. 13, Cardinal Business Media, Inc., p. 18 (5): "Data Mining:Techniques to Gain Insight Into Your Data (Technology Information)", Dec. 1995.

Cipolla, Emil T., "Data Mining: Techniques to Gain Insight Into Your Data," Enterprise Systems Journal, Dec. 1995, vol. 10, No. 13, p. 18 (5).

Primary Examiner—Paul R. Lintz
Assistant Examiner—Ella Colbert
Attorney, Agent, or Firm—Schmeiser, Olsen & Watts

[57] ABSTRACT

According to a preferred embodiment of the present invention, a method and apparatus for quickly and easily retrieving, manipulating and analyzing large quantities of computer-based data relevant to television-viewing consumers is disclosed. The most preferred embodiment of the present invention is a computer-based decision support system that includes three main components: a data conversion mechanism; a database mining engine (DME) in conjunction with a customized database; and a customized user interface that provides access to the various features associated with the system. In addition, the various preferred embodiments of the present invention are available for use with any standard personal computer, making the system available to a much larger group of decision-making executives than ever before possible. The user interface, in conjunction with the DME, provides a unique and innovative way to store, retrieve and manipulate data.

30 Claims, 10 Drawing Sheets

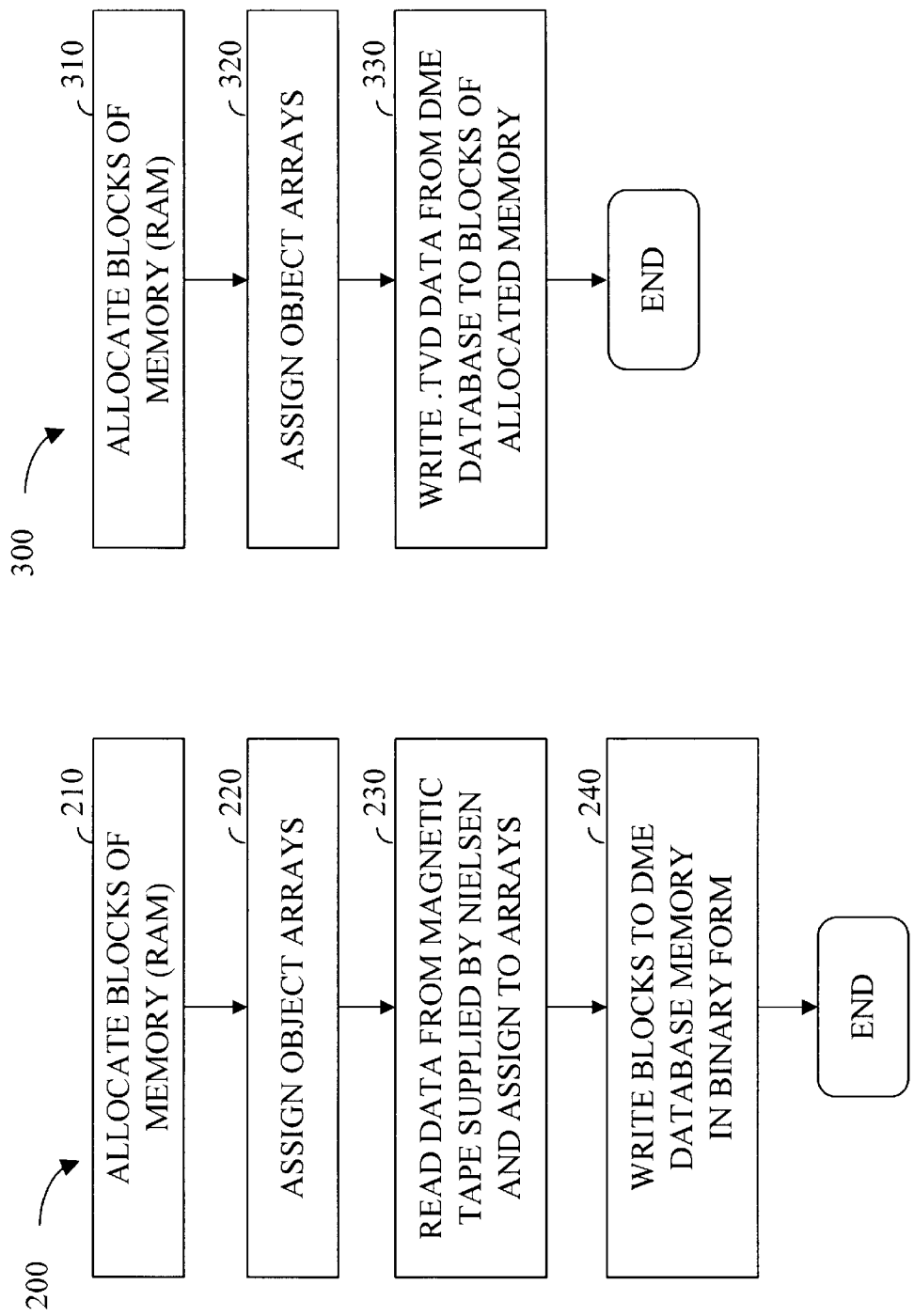

| AGE RANGE (YEARS) | REPRESENTATION (HEX) | REPRESENTATION (BINARY) |
|---|---|---|
| 2-5 | 1H | 1 |
| 6-8 | 2H | 10 |
| 9-11 | 3H | 100 |
| 12-14 | 4H | 1000 |
| 15-17 | 8H | 10000 |
| 18-20 | 20H | 100000 |
| 21-24 | 40H | 1000000 |

FIG. 5

| | WEEK 1 | WEEK 2 | WEEK 3 |
|---|---|---|---|
| OFFSET: | 0 | 8 | 17 |

640 → WEEK 1, 640 → WEEK 2, 640 → WEEK 3

WEEK 1 (VIEWING INDEX):
| | |
|---|---|
| 0 | 0 |
| 1 | 1 |
| 2 | 2 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 13 |
| 13 | 16 |
| 14 | 17 |
| 15 | |
| 16 | |
| 17 | 18 |
| 18 | 19 |
| 19 | |
| 20 | |
| 21 | |
| 22 | |
| 23 | 21 |
| 24 | 22 |
| 25 | 23 |
| 26 | 24 |
| 27 | 25 |
| 28 | 26 |

WEEK 2 (VIEWING INDEX):
| | |
|---|---|
| 0 | 0 |
| 1 | 1 |
| 2 | 2 |
| 3 | 3 |
| 4 | 4 |
| 5 | 5 |
| 6 | 6 |
| 7 | |
| 8 | |
| 9 | 7 |
| 10 | 8 |
| 11 | |
| 12 | |
| 13 | |
| 14 | |
| 15 | 10 |
| 16 | 11 |
| 17 | 12 |
| 18 | 13 |
| 19 | 14 |
| 20 | 15 |

WEEK 3 (VIEWING INDEX):
| | |
|---|---|
| 0 | 0 |
| 1 | 1 |
| 2 | |
| 3 | |
| 4 | |
| 5 | |
| 6 | 3 |
| 7 | 4 |
| 8 | 5 |
| 9 | 6 |
| 10 | 7 |
| 11 | 8 |

FIG. 7

FIG. 9
FIG. 10
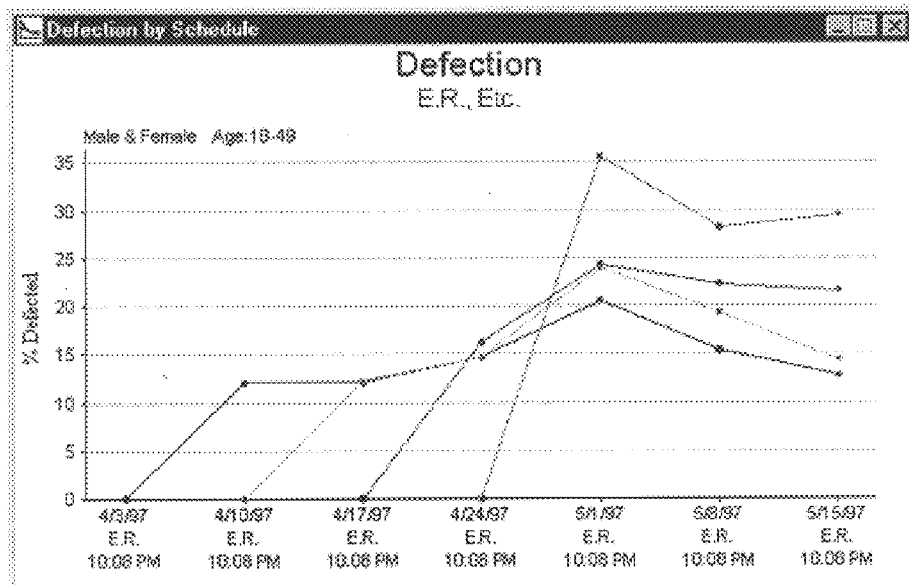
FIG. 11

FIG. 13

MANIPULATING AND ANALYZING DATA USING A COMPUTER SYSTEM HAVING A DATABASE MINING ENGINE RESIDES IN MEMORY

BACKGROUND OF THE INVENTION

1. Field of the Invention

The present invention relates to the field of computer-assisted data manipulation and analysis. More particularly, the present invention relates to methods and techniques for quickly and efficiently accessing and sorting large quantities of demographic data and media access information for various decision-making purposes.

2. Description of Related Art

Television viewing is one of the most popular activities in homes around the world. Large numbers of people both in the United States and abroad use the television as a primary source for news, entertainment, and various social activities. This large population of television viewers is also a very desirable group of consumers, sought after for their purchasing power. Most businesses and companies recognize the potent power of the television when it comes to attracting and retaining consumers for their various products and services. Television has the capability to transmit virtually any message to millions of people in an instant. Because of this enormous potential, television advertising is believed to be one of the most important advertising vehicles available for reaching a desired consumer population.

Because television has an enormous potential to reach many consumers, many businesses spend large amounts of money on television advertising, thereby making advertising revenue a major source of income for both the networks which create television programs and the television stations which broadcast them. Broadcast television advertising revenue is estimated to be in excess of $30 billion per year, which explains why advertisers care so much about television viewing. The most important part of the equation is to try and get the advertising message in front of the right group of television-viewing consumers, i.e., matching the product with the target market.

Since the value of target marketing is well known, the focus of most businesses is to try and place their advertisements in commercial slots on television shows that effectively attract and retain the targeted consumer groups. For example, many major sporting events are heavily subsidized by advertising campaigns and commercials promoting beer. On the other hand, most weekly home and garden programs don't present any advertising or commercial promotions for alcoholic beverages. Obviously, the businesses that advertise and market alcoholic beverages such as beer have determined that the consumers who purchase beer are more likely to be watching Monday Night Football than Martha Stewart's living. By focusing beer-related advertising efforts on those programs the target audience is most likely to watch, the results from the advertising campaign will, in theory, pay greater dividends.

By extension, in order to maximize the impact of a given advertising campaign, it is very useful to have demographic information about the television viewing audience that will help to match the advertising campaign with the target market. This demographic information can include information such as a viewer's age, geographical location, income, and level of education. These factors and other factors such as program genre and time of day for broadcasting the television program are all relevant variables in determining what kind of advertising slots should be purchased to most effectively market a given product to a given target market.

To effectively determine which shows are most favored by the desired target market, advertising agencies and businesses have utilized the services of various different research and consulting firms. These firms purportedly have the ability to accurately identify which segment of the consumer population is most likely to be viewing which television program at any given time. In addition, these research firms try to predict which viewers will be most receptive to various advertising campaigns, based on the demographic make-up of the viewing population. Based upon the weekly viewing information prepared and presented by the television viewing-related research firms/agencies, advertising campaigns are born and terminated. Further, new shows are identified as "must watch" programs and less fortunate programs are summarily dismissed from the airwaves. Finally, millions and millions of advertising dollars are spent, in a frequently vain attempt to reach a desired target audience. While sound in theory, the application of most theoretical viewing models has not been successful.

Although the practice of identifying target markets and developing advertising campaigns that will effectively reach those targeted consumers is a fairly advanced science, the ability to accurately and efficiently determine which television programs those desired consumers are watching at any given time is a far-less developed area of industry. One of the main problems with the currently used models and techniques for identifying and segmenting the television-viewing audience is the lack of effective tools for providing real time response to pertinent questions about viewing habits. Using the current systems and methods to manipulate and analyze the huge amounts of data that are available to decision-makers can take days or even weeks to accomplish. Frequently, the various systems available today will provide data that are no longer relevant by the time the data are generated. In addition, the currently available tools impose artificial limits on advertising agencies and media planners that are actively involved in the decision-making process.

This is particularly true when trying to create and/or customize an advertising campaign to reach the target market in the most cost-effective manner for a given advertiser. There are, at present, no interactive methods or tools available to the media planner for efficiently accessing media-related data. Most media planners have the data available to make strategic decisions, but the available tools do not allow easy access to the data in an intuitive, interactive environment. This means that the planning process is more an art than a science, and many years of experience are required to effectively determine or even estimate the probable effectiveness of a given advertising strategy.

Another significant drawback of the systems and methods presently used to analyze television audience viewing data is limited access. Most systems available today are large, expensive computer systems that many smaller companies cannot afford to purchase. Given limited access, many companies are forced to pay high-priced consultants to analyze the relevant data and to provide access to the desired information. This further limits the value of the available data.

Without a more effective system for manipulating and analyzing the presently available information regarding the viewing habits of television audiences, advertising agencies, networks, businesses, and other interested organizations will continue to be limited in their efforts to produce effective advertising campaigns. The result will undoubtedly be more wasted advertising dollars and an unnecessary loss in revenue for everyone that relies on the presently available systems/methods for analysis and decision-making purposes.

DISCLOSURE OF INVENTION

According to a preferred embodiment of the present invention, a method and apparatus for quickly and easily retrieving, manipulating and analyzing large quantities of computer-based data relevant to television-viewing consumers is disclosed. The most preferred embodiment of the present invention is a computer-based decision support system (DSS) that includes three main components: a data conversion mechanism; a database mining engine (DME) in conjunction with a customized database; and a customized user interface that provides access to the various features associated with the system. In addition, the various preferred embodiments of the present invention are available for use with any standard personal computer, making the system available to a much larger group of decision-making executives than ever before possible.

The user interface, in conjunction with the DME, provides a unique and innovative way to store, retrieve and manipulate data from existing databases, which describe the viewing habits and preferences of the television viewing audience. By using a database with a simplified storage and retrieval protocol, the data contained therein can be effectively manipulated in real time. This means that previously complex and lengthy information retrieval and analysis activities can be accomplished in very short periods of time (typically seconds instead of minutes or even hours). Finally, the user interface for the system provides access the DME in a simple and straightforward manner, significantly reducing training time.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a flowchart depicting a process for converting database information containing person-by-person information from one format to another in accordance with a preferred embodiment of the present invention;

FIG. 3 is a flowchart depicting a process for loading database information containing person-by-person information from one storage location to another in accordance with a preferred embodiment of the present invention;

FIG. 5 is a filter mask according to a preferred embodiment of the present invention;

FIG. 7 is a graphical representation of the viewing catalog for a three-week period;

FIG. 9 is a screen shot of cross tabulation data contained from a media-related record in a database file according to a preferred embodiment of the present invention;

FIG. 10 is a screen shot of an icon for accessing data contained in a database file according to a preferred embodiment of the present invention;

FIG. 11 is screen shot of a line graph representing data contained in a database file according to a preferred embodiment of the present invention;

Figure 13:
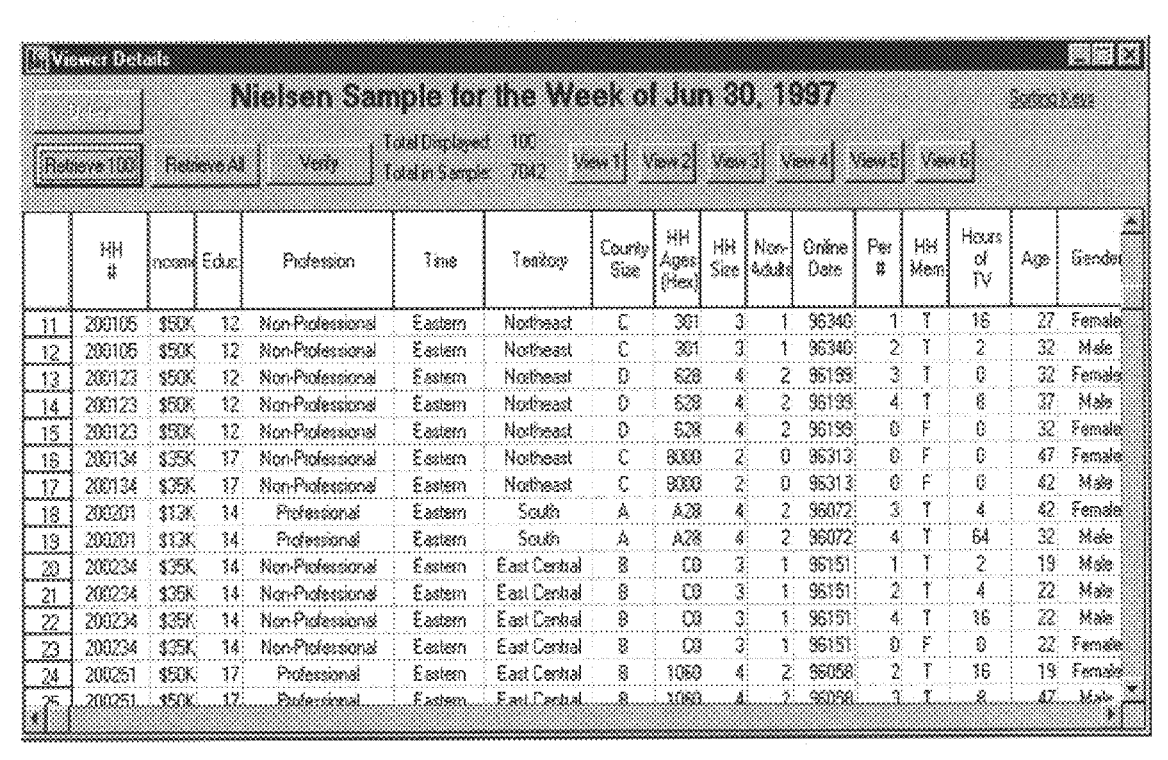

FIG. 13 is screen shot of a graphical representation of data contained in a database file according to a preferred embodiment of the present invention.

BEST MODE FOR CARRYING OUT THE INVENTION

Figure 1:
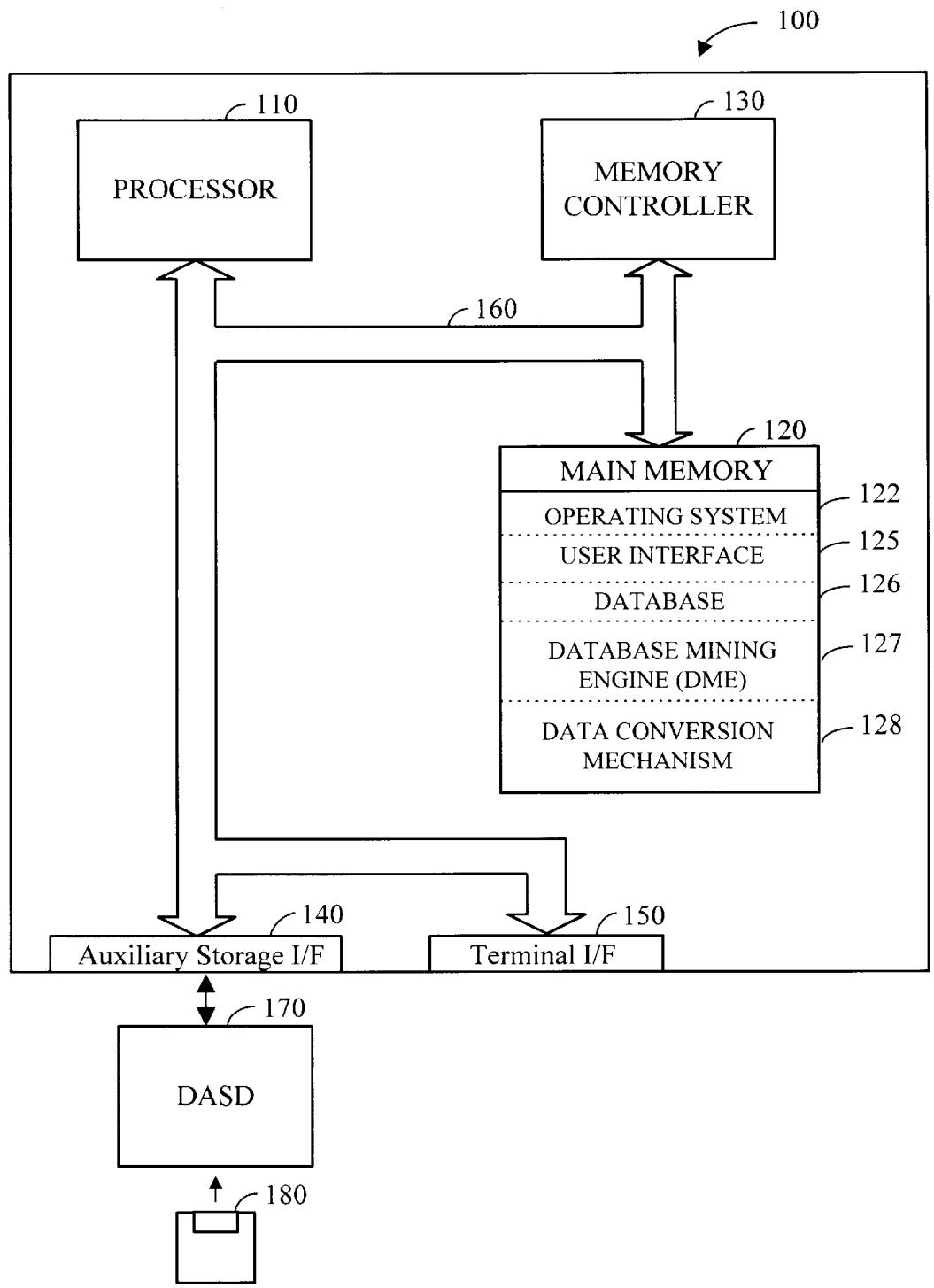
FIG. 1 is a block diagram of a preferred embodiment of the present invention.

The various preferred embodiments of the present invention below are described in connection with the person-by-person data gathered and distributed by Nielsen Media Research Service. THis approach has been selected to more clearly and distinctly explain the various embodiments of the present invention. However, although the present invention is described in the context of television viewing, it is important to note that person-by-person data for any type of media may be utilized with various preferred embodiments of the present invention. For example, various embodiments of the present invention are contemplated to address readership information for magazines or newspapers as well as browsing information for individuals accessing web pages on the World Wide Web.

For those individuals who are not well versed in the generation and use of person-by-person data such as the data associated with the Nielsen Media Research Service, the Overview section below presents many of the concepts that will help to understand the invention. Those who are generally familiar with the present state of television ratings systems and analysis may proceed directly to the detailed description section below.

1. Overview

Television viewing for the population of the United States is estimated by A. C. Nielsen Company (Nielsen) based on viewing logs generated from a sample of 5,000 households, with a total of about 15,000 sample members living in those households. Using specialized equipment attached to televisions in the homes, and communicating with these devices using telephone line connections; Nielsen accumulates data. The Nielsen data describes the viewing choices of each of the household members in a time segment format. This viewing information is packaged and sold as a service by Nielsen to television stations, network programmers, advertising agencies, marketing research groups, universities, and other interested individuals.

On a weekly basis, Nielsen supplies to subscribers of their services person-by-person data files that detail the television viewing choices for each of the sample members in the sample population. The data contained in these files indicate whether or not each of the sample members was watching television during the midpoint of each 15-minute period during the week. If the sample member was watching television, the data also indicate which television program they were watching. Also delivered with the data is additional information describing the demographic characteristics of the households and sample members living in each household, such as geographic territory, household income, education, age, and gender of the members living in the household. The typical size of a data file for one week is about 35 Mbytes.

On a regular basis, Niclsen modifies the overall sample population profile by adding new households or dropping certain households from the sample. A household can be included in the sample for as long as two years, after which time the household will be removed from the sample population. However, for various reasons such as relocation, death, and unreliability, households will often remain in the sample for only a few weeks or months. Also, any given sample household and/or sample member(s) in the sample population can be judged by Nielsen to be out of tab for a day. This means that the television viewing data for a particular household or member for that day are not reliable for estimation and reporting purposes. Similarly, those households and members that have apparently reliable data for a given day are termed in-tab by Nielsen.

Nielsen assigns each of the sample households a globally unique household number that is used to track the data for that household as long as the household remains in the sample. Similarly, each household member is assigned a unique person number within each household. Thus, even though the data files are delivered to subscribers in separate files each week, the television viewing habits of sample members can be tracked for each and every week in which they are included in the sample.

Although people visiting the sample households and watching television in a sample household are logged and identified in the data, they are not assigned unique person numbers. Therefore, the viewing history for household visitors cannot be accurately tracked from one day or week to the next. Nielsen does, however, provide information regarding the age and gender of each visitor in a Nielsen household.

As previously mentioned, although this very significant body of data are available for use by businesses and organizations that hope to benefit by analyzing it, the limitations of the present analysis tools and techniques have been too cumbersome to overcome. The two main factors which in the past have made the Nielsen person-by-person data difficult to work with are the tradeoff between database size and system performance, and the problems associated with the unification of the sample data. In addition, several other difficulties with accessing and analyzing the Nielsen data have been noted. These various problems are explained briefly below.

Many types of data analysis require the use of many weeks, months, or, in some cases, years of data. Patterns of program and network loyalty, for example, cannot be effectively analyzed without a large quantity of data which spans periods that are at least as long as the time required to established these patterns. In the case of the Nielsen data, each additional week of person-by-person data increases the size of the Nielsen database by approximately 35 Mbytes.

As the size of the person-by-person database increases, system-level processing constraints and limitations become a significant concern. If, for example, a person wanted to select only those members of the sample population who fell into a particular demographic group, then the entire database for all weeks would need to be filtered using the specific demographic criteria selected. Using the Nielsen data, this task can be daunting.

In the context of analyzing the Nielsen data, the principle of sample unification refers to the process of correlating the individual data elements from multiple sets of data. The viewing data from each viewing day and week for each sample member, for example, needs to be matched or correlated for analysis. If a particular query requires data for 10 days of viewing spanning a four-week calendar period, then only those sample members who were both in the sample and in-tab for each of the 10 days should be included in the sample. For limited data sets and moderate sample sizes, the sample unification process is manageable using conventional database techniques. For data sets of the size available from Nielsen, the unification task becomes daunting one without the creation of specialized tools as described herein.

The most ambitious studies using Nielsen data previously undertaken by independent researchers and practitioners have spanned only a very few weeks, generally two to four weeks. These researchers have invariably noted the difficulties that they have encountered with the sheer size and cumbersome nature of the data. Periodically, Nielsen processes requests for specialized studies made by subscribers of their services that include more data than this. However, even these special studies still generally span a limited number of weeks of data, require the use of the substantial computing resources available to Nielsen, and may require several weeks of calendar time to generate the results.

Other problems related to the size of the Nielsen data files are particularly troublesome for organizations with multiple geographic locations that need to access the Nielsen data files. Organizations with offices spanning large geographic areas require duplication of the database in each location to avoid frequent remote retrieval of large quantities of data. Weekly updates to each database with 35 Mbytes of data would become prohibitively difficult. In addition, if such a data service became widely popular, the task of delivering and installing data for numerous clients using conventional database management systems would also become unreasonably difficult for a data vendor using existing technology.

In addition, users frequently need access to the data using desktop and laptop computer systems. This requires duplicating portions of the database on other computer systems. For example, if a user needs stand-alone access to three months worth of Nielsen data, they would have to install over 250 Mbytes of data into a new environment.

Yet another problem becomes apparent when using the Nielsen data for demographic studies and analysis. One mode of inquiry into the Nielsen data could be termed "browsing." In this mode a user interactively interrogates the data, often with a given inquiry being based on a previous inquiry. A user would, for example, look at some type of viewing analysis for a selected demographic group, then alter the selected demographic and examine the same analysis for comparison. The data analysis system, then, needs to be able to select a subset of the sample based on the demographic parameters chosen by the user. This, of course, is not a difficult task to perform for many database management systems. The SQL database query language, for example, supports these types of queries. But to do so with sufficient speed to allow interactive browsing is not possible at the current time with widely available computer systems and traditional DBMS software. The data sets are simply too large and the queries too complex.

Finally, the physical structure of the records in the Nielsen data files can also introduce unnecessary complexity into the analysis process. Nielsen supplies data to their subscribers in a record-oriented format. Six different record types are used to detail the person-by-person data and each of these six record types is explained briefly below.

Calendar record (record type 0). The calendar record identifies the broadcast week for all other records. One calendar record is provided for each week's data.

Example:

```
005297051297051397051497051597051697051797051809705120970
51309705140970515097051609705170970518
```

This calendar record indicates that the week of data included in the data set begins on May 12, 1997 and ends on May 18, 1997.

Classification data record (record type 1). The classification data record describes each household in the sample in terms of income, education of the head of the household, time zone, etc. This record also specifies the age and gender of each household member and visitors to the household during the week. The Nielsen data file typically includes 5000 records per week.

Example:

```
100040520200034117248342520222222213109605305
A01Q02Y03J04A00
```

The classification data record shown above describes household number 200034. It indicates that the household was added to the Nielsen sample on the 53$^{rd}$ day of 1996, that the household was in-tab for all seven days of the week, and that the household for the week includes four household members and one visitor. Each household data item in each classification record will be translated to binary form. The income indicator "5" in the record above, for example, is translated to the binary number "00100000." Similarly, the age and gender data for each person in the record is also translated to binary form and assigned to the corresponding attribute in an object created for the person.

Program data lead record (record type 2). The program data lead record describes each quarter hour of programming broadcast during the week including program name, episode name, air date and time, program genre, etc. Typically, 1500 program data records are used to describe all programming broadcast in a given week.

Example:

```
20453 1890800003020SEINF 052501SEINFELD2100NCS09480128599
```

The sample program data lead record shown above indicates, among other things, that the Seinfeld show airs on NBC at 2100 hours (9:00 PM), it's a situation comedy, and that the program run length is 30 minutes. Dates, times, and quarter hour values in the program data item are converted from an ASCII representation as shown above to a binary representation, and assigned to corresponding attributes in a program object.

Program data continuation record (record type 3). Specifies those households and household members who were logged as viewing each quarter hour of network programming broadcast during the week as described by the program data lead record.

There are 50,000 program data continuation records supplied in the Nielsen data per week.

Example:

```
30453020003400002000034Y0302000740000200074X010200074I
02020025100020025IT0102003410000200341M0102003820000200382X
010200382P02
```

This record indicates some of the households and people who were watching Seinfeld at 9:00 PM on NBC. As indicated by the 10 character string "200034000" (the "viewing event string") in the record, one of the households was number 200034. In that household, as indicated by a 10 character "200034Y03" viewing event string in the record, person number Y03 was also watching the program.

Usage data lead record (record type 4). The usage data lead record identifies by sequence number each quarter hour during the broadcast week. There are 672 records per week contained in the Nielsen data files.

Example: 400660205222200274804115

This usage data lead record assigns the sequence number 0066 to the quarter hour which begins at 10:00 PM on the 2$^{nd}$ day of the week (Monday). 2,748 households in the sample were using their televisions at that time, and 4,115 people were watching television in those households. The date/time in each usage data lead record is noted and used in reading each subsequent usage data continuation record.

Usage data continuation record (record type 5). Specifies those households and household members who were logged as using the television during each quarter hour as noted by the usage data lead records. There are 200,000 usage data continuation records per week supplied in the Nielsen data files.

Example:

```
50066020003400002000034Y0302000341J0402000830000200083W
010200105000200105W010200105I0202002010000200201I
0402002510000200251U02
```

This usage data continuation record identifies some of the 2,748 households and 4,115 people in the sample who were watching television on the 2$^{nd}$ day of the week at 10:00 PM. One of the households was number 200034, as indicated by the 10 character viewing event string "200034000" in the record. In that household, person number Y03 was watching, as indicated by a 10 character "200034Y03" viewing event string in the record. The specific program being watched is not specified. It may have been a network program. Alternatively, it may also have been a cable channel or a broadcasting station unaffiliated with one of the networks.

Two separate records are used to describe television viewing in the Nielsen data files, a program data record and a usage record. The program data record indicates all those persons and households in the sample who viewed a particular network program. Viewing of non-network programming is not indicated in the "program data" record. The "usage" record indicates television usage by person and household. With this data, to find all instances where sample members watched non-network programming, those instances in which the program data indicates the household members were watching network programming must be subtracted from the usage entries. The usage entries remaining after this subtraction are the non-network viewing entries.

2. Definitions

Homes Base. Home base is defined as the total number of homes in the United States with one or more television sets.

Approximately 95 million homes fall into this category. This figure, on a percentage basis, includes more than 98% of all homes.

Prime Time. The federal government defines prime time as those evening hours during which the television networks are allowed to broadcast their programming. These hours are from 7:00 PM to 11:00 PM on Sunday, and from 8:00 PM to 11:00 PM otherwise.

Households Using Television (HUTS). HUTS is the total number of homes with televisions turned on at a given time. During prime time this number is often over 60 million. The percentage of all homes with television sets which had those sets turned on is referred to as "percent HUTS" or "HUT rating." If the homes base was 95 million and HUTS was 60 million, then the HUT rating would be HUT rating=homes watching television/homes with television=60 million/95 million=63.2% HUTS.

This value is consistently referred to as simply HUTS rather than percent HUTS or HUT rating. True HUTS (in millions of homes) is rarely used. This convention is adopted herein as well. In every case where the term "HUTS" is used, this will actually refer to HUT rating. HUT levels typically peak at over 60% during prime time and can be less than 20% between 7:00 and 10:00 a.m. during the summer. HUTS typically bottoms out at about 4:00 a.m. on weekdays at about 7%.

Household Rating. Household rating is defined as the portion of all homes having televisions sets which had those sets tuned to a particular show. Thus if we assume that there are 95 million televisions in the nation and 15 million are tuned to a particular show then $$\begin{aligned} \text{rating} &= \text{homes watching a show/homes base} \\ &= 15 \text{ million}/95 \text{ million} \\ &= 15.8\% \end{aligned}$$

Demographic rating is similar to household rating, but is calculated using the number of people in a particular demographic group who saw the show divided by the number of people in the population for that demographic group.

Share. Share is defined as the portion of homes with television sets on which were tuned to a particular show. If 60 million homes had televisions turned on, as in the example above, and 15 million were watching a particular show, then share=homes watching a show/homes watching television =15 million/60 million=25%

Rating and share are related through HUTS.

rating=HUTS×share=63.2%×25%=15.8%

Homes Delivered. Advertising effectiveness is sometimes based on homes delivered to an advertiser. This value is defined as the rating for a show multiplied by the total number of homes with television sets. The homes delivered for a show with a 15.8% rating would be $$\begin{aligned} \text{homes delivered} &= \text{homes base} \times \text{rating} \\ &= 95 \text{ million} \times 15.8\% \\ &= 15.0 \text{ million} \end{aligned}$$

This is equivalent to the total number of homes with their television sets turned on multiplied by the share. Assuming that 60 million homes were watching the show $$\begin{aligned} \text{homes delivered} &= \text{homes base} \times \text{HUTS} \times \text{share} \\ &= 95 \text{ million} \times 63.2\% \times 25\% \\ &= 15.0 \text{ million} \end{aligned}$$

Special rules defined by Nielsen apply for computing these types of household-based measurements for households with multiple television sets during those times when the television sets in the household are tuned to different channels. See Nielsen Media Research [1994] for a detailed description of these rules.

Viewers Per Viewing Household (VPH). VPH is defined as the number of viewers of television averaged over all households watching television and varies by half-hour and by show. Some shows tend to have larger groups of people watching than other shows. This number by definition is never less than one, and is rarely over two.

Impressions. Advertisers often speak in terms of impressions. An impression is defined as one person viewing either one show or one advertisement one time. It can be calculated using homes delivered and VPH. Assuming that for a particular show, the average number of people watching per home is two, then impressions is the product of homes delivered and VPH.

$$\begin{aligned} \text{impressions} &= \text{homes delivered} \times \text{VPH} \\ &= \text{homes base} \times \text{rating} \times \text{VPH} \\ &= 95 \text{ million} \times 15.8\% \times 2 = 30.0 \text{ million} \end{aligned}$$

3. Detailed Description

As explained above, a computer-based system 100 according to a preferred embodiment of the present invention includes three main components: a database mining engine (DME) in conjunction with a DME database; and a user interface which controls the system and allows a user to manipulate and analyze the data in the DME database by using the DME. Taken together, these components offer a powerful tool for manipulating and analyzing Nielsen viewer data for decision-making purposes. Further, since the various embodiments of the present invention are designed to be used in a computer-based environment, a suitable computer system is necessarily a part of the present invention. Each of these main components will now be described in greater detail.

Computer System

Referring now to FIG. 1, a computer-based system 100 for data manipulation and analysis in accordance with a preferred embodiment of the present invention includes an IBM PC compatible computer. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a Central Processing Unit (CPU or processor 110), main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100. Those skilled in the art will recognize that there are many possible computer systems which will be suitable for use with the present invention.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer program 122 within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/or through auxiliary storage interface 140 to processor 110. While memory controller 130 is shown as a separate entity for purposes of explanation, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Main memory 120 suitably contains an operating system 122, a graphical user interface 125, a Database Mining Engine (DME) database 126, a Database Mining Engine (DME) 127, and a data conversion mechanism 128. Operating system 122 in memory 120 is used to control the functional operation of system 100. Graphical user interface 125 in memory 120 provides access for a user of system 100, allowing the user to access the various features of system 100. DME database 126 is a customized version of a previously created database that is optimized for access by DME 127 via graphical user interface 125. DME 127 is a specialized database management system (DBMS) which is optimized to search, manipulate, and analyze person-by-person records in a database format. DME 127 uses a set of filters to access the data contained in DME database 126 to formulate responses to queries from a user of system 100. Although shown as separate components for this example, the various components shown in memory 120 may alternatively be individual parts of a single software program. The various components loaded into memory 120 are typically loaded into memory 120 from a secondary storage location such as DASD 170. The term "memory" as used herein refers to any storage location in the virtual memory space of system 100.

It should be understood that main memory 120 does not necessarily contain all parts of all mechanisms shown. For example, portions of operating system 122 may be loaded into an instruction cache (not shown) for processor 110 to execute, while other files may well be stored on magnetic or optical disk storage devices (not shown). In addition, although Database Mining Engine (DME) 127 is shown to reside in the same memory location as DME database 126 and operating system 122, it is to be understood that main memory 120 may consist of multiple disparate memory locations (e.g. backside cache, look-aside cache, etc.).

1. Introduction

The following section describes some of the most salient features of DME database 126, DME 127, and the associated techniques and tools used in preparing the Nielsen television-related viewing data (Nielsen data) for use in system 100. In order to more quickly and efficiently process the large volume of data contained in the Nielsen data files, the generally accepted concepts of database design and manipulation so prevalent today must be discarded or modified. This is simply because the various relational and hierarchical database models in use today are too unwieldy for manipulating large data files with any significant speed, absent very specialized and expensive computer hardware.

The unique format of DME database 126, combined with the functional aspects of DME 127, overcomes several limitations of conventional database and data processing techniques which tend to reduce the performance of most data analysis systems to unacceptable levels. Although the various preferred embodiments of the present invention are presented and described in the context of television viewing, other types of data may be manipulated and analyzed in a similar fashion. It should be noted that the concepts and techniques of the present invention are equally applicable to tracking and analyzing the behavior of a sample population for visitors to web pages on the World Wide Web. Similarly, information about the readership populations for magazines and newspapers could also be manipulated and analyzed by applying various preferred embodiments of the present invention. Indeed, any advertising firm/agency, business, or other organization that wishes to track large quantities of information regarding various sample populations can successfully implement the various techniques and methods described herein.

A system 100 according to various preferred embodiments of the present invention has the following significant advantages: the ability to add, on a weekly basis, large quantities of data to the existing user databases; a way to easily move relevant portions of existing databases from location to location (such as from a central server to a laptop computer); the ability to retrieve large blocks of data from the database, organize the data in memory, and analyze the data; the ability to filter the data according to user selected demographic criteria; and retrieve information for the same sample members across multiple weeks.

The various capabilities listed above are a direct product of the unique design of DME database 126 and the techniques associated with manipulating the data contained in DME database 126. The design of D)ME database 126 is performance driven and, for at least one preferred embodiment, is specifically designed to efficiently access the Nielsen data. Using most standard computers, the performance of a general purpose DBMS will typically be inadequate for interactive analysis when manipulating the hundreds of Mbytes of data that comprise the Nielsen data. Recognizing this, a custom DBMS (i.e. DME database 126 and DME 127) can be created to take advantage of the specific characteristics of the data (in this case, television viewing data prepared by Nielsen). The organization and manipulation methods and techniques for accessing DME database 126 are described below.

2. Detailed Description of DME Database

DME Database Organization

A DME database 126 according to a preferred embodiment of the present invention is capable of spanning many weeks and is composed of .tvd discrete files, one file corresponding to each week of the Nielsen data. The name assigned to each of the files in DME database 126 is the date of the Nielsen data contained within that file. For example, data for the week ending Jul. 28, 1997 is contained in a file with the name 19970728.tvd. TVD is an acronym for Television Viewing Data and is used to identify all files with a format suitable for use with the present invention. To add an additional week of Nielsen data to DME database 126, the .tvd file that contains that week's viewing data is simply placed into the directory for DME database 126 along with all other .tvd files. This feature of the present invention makes it very easy to keep DME database 126 up to date.

A user or system administrator can create a copy of all or a selected portion of DME database 126 by copying some or all of the .tvd files to another memory storage location, and then, by using a command that can be accessed through graphical user interface 125 described below, direct system 100 to access the new database location. No other database installation process is required.

DME Database File Format

The .tvd data files contained in DME database 126 can be considered object-oriented for several reasons. First, the various components of the Nielsen data are treated as a group of various objects, i.e. a household object, a person object, a television program object, etc. Accordingly, all of the data for each discrete object, such as a household, person, or television program object, is located contiguously in the .tvd file.

For example, the data describing a particular person's age, gender, and person number are physically adjacent in the individual database file, rather than as columns in a relational table. In addition, the length and relative byte position of each data element for each object in the database file is the same as the required length and byte position of those same data elements in memory 120. Further, the relative positions of data in the file and in memory 120 are the same. A region of memory 120 is allocated for loading sets of person objects (or program objects, or household objects). Memory 120 is sized according to the type of object being loaded and number of objects in the collection.

Given this memory allocation, the data is loaded in a binary fashion from the Nielsen data file into memory 120. During this loading process, data attributes are ignored. The first byte of person object data for the person collection in the file, for example, is loaded into the first byte of allocated memory. The second byte of data is then loaded into the second byte of allocated memory, etc. This process is both fast and reliable. It is important to note that the data are not loaded as objects, but once the data is loaded into memory 120, system 100 can operate on the data as objects. Third, data items are retrieved from the database as objects and collections of objects, rather than as discrete data elements which are assembled into objects in memory. Finally, the data for similar objects, such as people in the same household, or programs of the same day, are also located contiguously in the file.

This unique database structure allows for binary data transfer of large blocks of objects from disk to memory 120. The objected-oriented database management software (DME 127), requires memory based data objects for processing and can begin operating on the .tvd data immediately after retrieval from DME database file 126.

DME Database File Creation

Although the data received from Nielsen is very valuable for analysis and advertising purposes, the format of the data does not readily lend itself to quick and efficient manipulation. For this reason, the various preferred embodiments of the present invention will read the data from the magnetic tapes supplied by Nielsen, reformat it, and store it in DME database 126 using .tvd files. The data conversion process is detailed in FIG. 2.

Referring now to FIG. 2, a process 200 in accordance with a preferred embodiment of the present invention for converting data from a first data format (i.e., the Nielsen format) to a second format (i.e., the .tvd format) is illustrated. As shown in FIG. 2, process 200 generally involves organizing the Nielsen data from the standard Nielsen format into the format required for object-oriented processing, then writing this memory data in binary form to individual .tvd files within DME database file 126. The basic steps for this process are: allocate blocks of memory 120 (step 210); assign these memory blocks to arrays of objects, such as arrays of person objects or program objects (step 220); read the data supplied by Nielsen and assign values to the object data elements in memory, such as age, or program name (step 230); and, write the blocks in binary form from memory 120 into a newly created DME database .tvd file (step 240). It is important to note that there is no requirement to locate all blocks of memory 120 in a contiguous fashion. Blocks of memory 120 may be allocated as needed, where needed to accommodate the Nielsen data.

Referring now to FIG. 3, a process 300 in accordance with a preferred embodiment of the present invention for accessing DME 127 is illustrated. When the data in DME database 126 is being used for analysis, the direction of data transfer is reversed. First, blocks of memory 120 are allocated and the blocks of memory 120 are assigned to arrays of objects (step 310); the blocks of data are read from the .tvd data files in DME database 126 in binary form into the allocated memory blocks (step 320); and then DME 127 can access the television viewing data. This type of data retrieval is not possible using conventional database systems because the binary representation of the data in a typical database is typically not the same as the data in memory 120. As explained above, for the various preferred embodiments of the present invention, the data storage format is identical.

Note, however, that if the structure of the various data objects in DME database 126 is modified to accommodate expanded types of analysis, then the .tvd database files also need to be modified to reflect those changes. As noted above, data is binary loaded from database file 126 into memory 120. Portions of memory 120 are sized according to the type of object being loaded and the number of objects in the collection. Using a database that is composed of 52 discrete weekly .tvd files, the assumed size of person objects in each of the 52 files is identical. Person objects in collections loaded from the week 1 file are the same size as person objects from the week 10 file.

For example, if the size of person objects in the Nielsen data is expanded by adding additional attributes, such as an occupation attribute or a head-of-household flag, this change would also need to be reflected in the size of the person objects in each of the 52 weeks of data. All 52 files would need to be recreated with the newly resized person objects. The design of DME database 126 does not provide the data type independence of many commercially available database management systems in which the representation of the data in the database is independent of the representation of the data in memory. However, by mirroring the data in both locations, a significant speed advantage is recognized.

As previously mentioned in the Overview section, the records in the Nielsen data files are converted for use with the preferred embodiments of the present invention. Each of the six supplied files plays a part in creating DME database 126 and the following conversion details are performed by DME 127. Once again, information in the calendar record is read but is not entered into the TVD database file. The data in the calendar record is used only to validate dates in other record types.

Each household data item in each classification record is translated to binary form as described in the section "Sample Filtering". This binary form of the data item is then assigned to the corresponding attribute in the household object created for the household. The income indicator "5" in the record above, for example, is translated to the binary number "00100000." Similarly, the age and gender data for each person in the classification record is also translated to binary form and assigned to the corresponding attribute in the person object created for the person. As Household and Person objects are created, they are added to their respective Group collections.

Each program data item in each program data lead record is assigned to the corresponding attribute in the program object created for the program. Dates, times, and quarter hour values in the program data item are converted from an ASCII representation as shown above in the Overview section to a binary representation, and assigned to the corresponding date/time attributes in the program object. As Program objects are created, they are added to the Program Group collection.

Prior to the step in the creation of DME database 126 where the program data continuation records are read, a Viewing Index is created, as described in the section "Viewing Data", and illustrated in the figure showing "Database Structure".

After creating the Viewing Index, for each network viewing event in each program data continuation record, the Household or Person object referred to in the event is found in the Household Group or Person Group collections. As described in the section "Viewing Data," the memory location in the viewing data memory for this household/person and date/time is identified, and a notation is made indicating that the household/person viewing the network program at the indicated date/time. The date/time in each usage data lead record is noted and used in reading each subsequent usage data continuation record.

Using the date/time from the usage lead record, for each viewing event in each usage data continuation record, the Household object or Person object referred to in the event is found in the Household Group or Person Group collections.

As described in the section "Viewing Data", the memory location in the viewing data memory for this household/person and date/time is identified. At this point a notation may be made to the record, conditioned on the presence or absence of a preexisting notation:

1) If a notation has already been made in this location based on a viewing event string in a Program Data Continuation record indicating that the household or person was watching network television, then no further notation is made. It can be assumed that the usage viewing event refers to this network viewing.

2) If no notation is found, then it can be assumed that the household or person was viewing non-network television, and a notation is made accordingly.

After processing all Nielsen data records for a given week, the resulting memory objects are written to disk as a TVD database file. Each memory location is written in binary form in sequence: first the viewing index is written. This index includes the offset value described in the section "Viewing Data". Following the index, all household objects are written, followed by all person objects, and program objects. Finally, the actual viewing data is written, all in binary form.

As described above, in the Nielsen data files, two separate records are used to describe television viewing. One is a program data record, and the other is a usage record. The program data record indicates all those persons and households in the sample who viewed a particular network program. Viewing of non-network programming is not indicated in the "program data" record. The "usage" record indicates television usage by person and household. With this record arrangement, to find all instances where sample members watched non-network programming, those instances in which the program data indicates the household members were watching network programming must be subtracted from the usage entries. The usage entries remaining after this subtraction are the non-network viewing entries.

Data Conversion Mechanism

Figure 4:
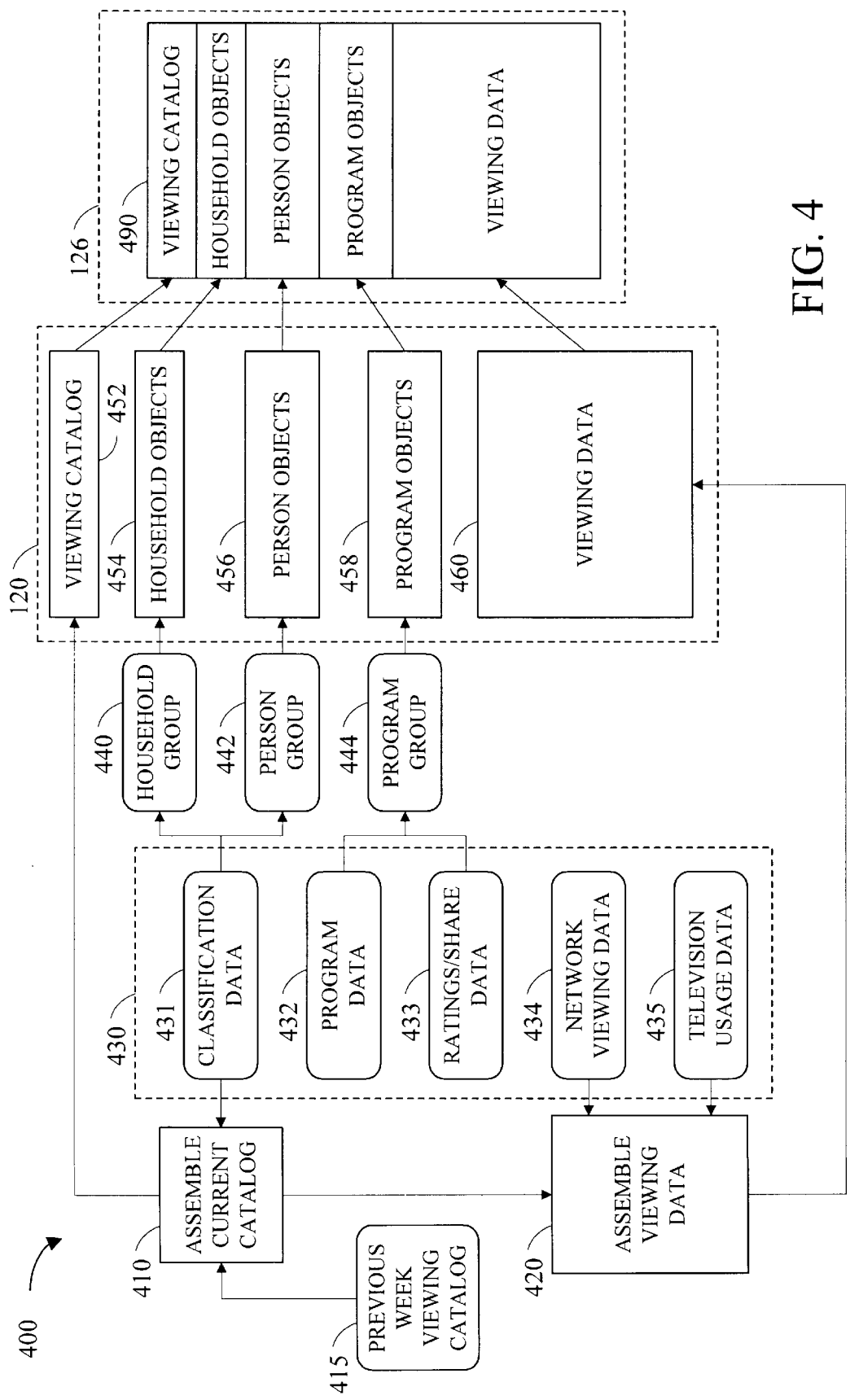
FIG. 4 is a block diagram of a data conversion method according to a preferred embodiment of the present invention.

Referring now to FIG. 4, a sample data conversion mechanism 128 and process adapted for use with the present invention are illustrated. A data conversion mechanism according to a preferred embodiment of the present invention is a computer-implemented process for converting person-by-person media-related data from a first data format to a second data format. The data conversion mechanism will use Processor 110 to execute the process and memory 120 as a storage location in order to convert the data.

The process of creating a .tvd data file for DME database 126 is one of reorganizing a weekly set of data as delivered by Nielsen in computer memory in the form required for object-oriented processing, then writing this memory data in binary form to DME database file 126.

Referring now to FIG. 4, the steps for performing data conversion via process 400 are described.

1) Allocate blocks of memory 120 which are sufficiently large to accommodate the data in the week being processed, and assign these memory blocks to arrays of household objects 454, person objects 456, program objects 458, and viewing data 460. Because it is unknown at this stage of the process exactly how many programs, households, etc. are include in the Nielsen data for the week, it is likely that portions of each of these memory blocks 120 will not be used, and will not be written to the completed .tvd database file 126.

2) Read all classification records.
   a) Read a classification record from Nielsen data 430.
   b) Select the next household object in the household object array 454 for this data.
   c) Translate to binary form the household attributes in the classification record. Each household data item in each classification record is translated to binary form as described in the section "Sample Data Filtering" below. This binary form of the data item is then assigned to the corresponding attribute in the household object selected for that given household. The income indicator "5" in the record above, for example, is translated to the binary number "100100000".
   d) Increment the household object array counter in Household Group 440 to indicate that the household has been added to household object array 454.
   e) For each person in the classification record, select the next person object in person object array 456.
   f) Translate to binary form the person attributes of age and gender data, and assign to the corresponding attribute in the person object selected for the person.
   g) Increment the person object array counter in Person Group 442 to indicate that the person has been added to person object array 456.
3) Assemble current viewing catalog (step 410).
   a) Allocate a block of memory 120 which is sufficiently large to accommodate viewing catalog 452 for the current week.
   b) For each household in household object array 454, locate the entry for the household in the viewing catalog for the previous week.
      i) If an entry exists in the viewing catalog for the previous week, then make an entry for the household in the same position in the viewing catalog for the current week.
      ii) If an entry does not exist in the viewing catalog for the previous week, then make a new entry for the household at the end of the viewing catalog for the current week.
      iii) Assign an entry in the viewing data 460 region of memory 120 for the household. Indicate this entry position in viewing catalog 452 for the current week.
   c) For each household member in the person object array, locate the entry for the person in the viewing catalog for the previous week.
      i) If an entry exists in the viewing catalog for the previous week, then make an entry for the person in the same position in the viewing catalog for the current week.
      ii) If an entry does not exist in the viewing catalog for the previous week, then make a new entry for the person at the end of the viewing catalog for the current week.
      iii) Assign an entry in the viewing data memory region for the person. Indicate this entry position in the viewing catalog for the current week.
   d) Entries are not made in the viewing catalog for those who are not members of households (visitors). Thus, for each person in the person object array who is not a member of a household, assign an entry in the viewing data memory region for the visitor. Indicate this entry position in the person object.
4) Read all program data records (both the lead and the continuation records) from Nielsen data 430.
   a) For each classification lead record, select the next program object in the program object array for this program data.
   b) Assign data items in the program data lead record to the program object selected for the program. Dates, times, and quarter hour values in the program data item are converted from an ASCII representation to a binary representation, and assigned to the corresponding date/time attributes in the program object.
   c) Increment the program object array counter in the Program Group to indicate that the program has been added to the program object array.
   d) For each program data continuation record, locate the Household or Person object referred to in the viewing event in the Household Group or Person Group collections.
   e) As described in the section "Viewing Data in the DME Database", identify the memory location in the viewing data memory for this household/person and date/time using the newly assembled current week viewing catalog for households and household members.
   f) Enter in the viewing data memory location a notation indicating that the household/person viewed the network program at the indicated date/time.
5) Read all usage data records (both the lead and the continuation records).
   a) For each usage lead record, identify the date and time of the quarter hour viewing event for the lead record. This date/time is used in reading each subsequent usage data continuation record.
   b) For each Household or Person in each usage continuation record, locate the Household or Person object in the Household Group 440 or Person Group 442 collections.
   c) As described in the section "Viewing Data in the DME Database", identify the memory location in the viewing data memory for this household/person and date/time using newly assembled current week viewing catalog 452 for households and household members.
   d) Enter in the viewing data memory location a notation indicating that the household/person viewed the television at the indicated date/time. This notation is conditional on the presence of a preexisting notation:
      i) If a notation has already been made in this location based on a viewing event string in a Program Data Continuation record indicating that the household or person was watching network television, then no further notation is made. We assume that the usage viewing event refers to this network viewing event.
      ii) If no notation is found, then we assume that the household or person was viewing non-network television, and a notation is made accordingly.
6) Write the allocated blocks of memory 120 onto disk in binary form into a newly created .tvd database file 490 located in DME database 126. In all cases, except as noted, the blocks of data are appended contiguously to .tvd file 490.
   a) Write header text which identifies the file for those users who attempt to edit, type or print .tvd file 490.
   b) Write a file format version number which can be read by DME 127.
   c) Write five long integers to .tvd file 490, each initially have a value of zero. These values are used to note the offset position in the database file of each of the arrays of objects and data. Each of these values will be updated (as noted below) with an actual offset value.

d) Write the viewing catalog 452 to .tvd file 490.
   i) Write the length of viewing catalog 452
   ii) Write the portion of viewing catalog 452 which has been used. Note the offset position from the beginning of the file of this catalog.
   iii) Write the offset value to the first offset position as described in (c) above.
e) Write the portion of household object array 454 to .tvd file 490.
   i) Write the number of entries in household object array 454.
   ii) Write the portion of household object array 454 which has been used. Note the offset position from the beginning of the file of this catalog.
   iii) Write the offset value to the second offset position as described in (c) above.
f) Write the portion of the person object array 456 to .tvd file 490.
   i) Write the number of entries in the person object array 456.
   ii) Write the portion of the person object array 456 which has been used. Note the offset position from the beginning of the file of this catalog.
   iii) Write the offset value to the third offset position as described in (c) above.
g) Write the portion of the program object array 458 to .tvd file 490.
   i) Write the number of entries in the program object array 458.
   ii) Write the portion of the program object array 458 which has been used. Note the offset position from the beginning of the file of this catalog.
   iii) Write the offset value to the forth offset position as described in (c) above.
h) Write the portion of the viewing data 460 to the file.
   i) Write the number of entries in the viewing data.
   ii) Note the offset position from the beginning of the file of this data.
   iii) Write the offset value to the fifth offset position as described in (c) above.
   iv) For each of the 28 periods of 6 hours each, write the portion of the viewing data 460 which has been used.
7) Close .tvd database file 490.
8) Write current viewing catalog 452 to a separate file for use in assembling the viewing catalog for the next week.

Although the example presented above specifically references person-by-person media-related data for network broadcasting, cable television network data can be added to the database file using similar techniques. In addition, similar database files can be created for other media types using similar techniques.

Sample Data Filtering Using DME Database

One significant advantage of the preferred embodiments for DME database 126 is the very fast access to the data for purposes of filtering data according to custom queries. Users will typically want to analyze the viewing behavior of selected demographic groups of people or households in the Nielsen sample for purposes of analyzing behavior and targeting desired consumer groups for advertising campaigns. The Nielsen data contains various data elements that can be used for filtering. These elements include: age; gender; income; level of education; profession; hours of weekly television viewing; and the ages of family members that live in the household.

This data can be used to identify and select various consumer groups for purposes of analysis and formulating advertising campaigns. For example, a system user might wish to select all women between the ages of 18 and 49 who live in households with children, and having incomes greater than $40K per year. Rather than use mathematical relations in a database management system to make this sample selection, the data in DME database 126 is organized so that the selection can be made using Boolean logic, which is relatively fast to compute using most typical computer systems.

Referring now to FIG. 5, the data elements for representing the age of the sample audience members, for example, are not stored as integers, but are stored as a 16 bit field where each bit represents one of the available age ranges. The first several age ranges are assigned bits in the field according to the table shown in FIG. 5. Additional age ranges can be represented in a similar manner. Given this structure, filtering the data contained in DME database 126 for age-specific criteria is a simple Boolean mathematical exercise. To select sample members based on age, graphical user interface 125 utilizes a 16 bit age selection mask with the required bits set to indicate the desired age range. If, for example, the user wanted to analyze sample members in the 12–20 age range, then the age selection mask would be 8H+10H+20H=38H (hex), or 0000000000111000 (binary). To determine whether or not a particular sample member represented in DME database 126 is in the desired age range, DME 127 performs a logical "and" operation using the member's age field and the age-appropriate selection mask. In the C programming language, this procedure may be represented as "PersonAge & AgeSelectionMask."

If the person were actually in the age range of 15–17, then the values would be

```
  0000000000010000 (age of audience member)
+ 0000000000111000 (age selection mask)
  0000000000010000
```

Which would result in a value of TRUE for the operation, thereby indicating that the person is in the requested age range.

Other similar operations can be envisioned to create filter masks for other demographic information contained in DME database 126. Given this structure, a sample selection based on multiple demographic fields would combine similar elements for those fields. For example, in the C programming language, a selection based on age, income, and education could be represented as shown immediately below.

((PersonAge & AgeSelectionMask) &&
 (HouseholdIncome & HouseholdIncomeSelectionMask) &&
 (HouseholdEduc & HouseholdEducSelectionMask))

By providing the appropriate mask for the desired demographic characteristics, DME database 126 can be quickly and efficiently screened to locate the sample audience members who fit the desired criteria. This kind of Boolean computation can be executed very quickly on a digital computer. Alternatively, although not preferred, a more conventional approach for a similar selection might be the expression shown immediately below.

if (PersonAge>=LowerSelectionAge &&
  PersonAge<=UpperSelectionAge &&
  HouseholdIncome>=LowerSelectionIncome &&
  HouseholdIncome<=UpperSelectionIncome &&
  HouseholdEduc>=LowerSelectionEduc &&
  HouseholdEduc<=UpperSelectionEduc)

The above expression is much more time consuming to evaluate in a computer by virtue of the fact that it is longer and the math operations (such as ">=") are more time consuming for processor 110 to evaluate than simple logical operations (such as "&") are to evaluate.

Viewing Data in tihe DME Database

The Nielsen person-by-person data provides "viewing data" for any given week. The viewing data indicates the viewing choices made by sample households and members living in the sample households for the midpoint of every 15 minute period during the week. For example, for the week of Sep. 22, 1997, the data may indicate that the viewing selection made by person number 2 in household number 200011 at 8:08 PM on September 24; the midpoint of the 8:00 PM to 8:15 PM quarter hour. The viewing options for this person include at least three distinct options: 1) watching one of the broadcast networks—ABC, CBS, Fox, or NBC; 2) watching non-network programming such as unaffiliated stations or cable; or 3) turning the television off, i.e. not watching television. As Nielsen makes other notational options available, such as including the Warner Brothers Network, these new options can also be noted in the data structure without modification.

If a person was not watching television during a given quarter hour, then no viewing records are present in the Nielsen data for that quarter hour. In addition, if the person was not in-tab for that quarter hour, then the data delivered by Nielsen indicates that condition as well.

In DME database 126, the sample viewing data provided by Nielsen for a given week requires about 7 Mbytes of storage space. In order to conserve memory space during subsequent processing and analysis, it is desirable to avoid allocating memory for an entire week of data when a user requires access to only some small portion of it. Therefore, a week of Nielsen viewing data is divided into 28 blocks of about 250 Kbytes each, with each block representing six viewing hours during the week for all households and people in the sample. The broadcasting week begins at 6:00 AM on Monday morning. Thus, the first block of viewing data begins at 6:08 AM on Monday and ends at 11:53 AM. Similarly, the second block begins at 12:08 PM and ends at 5:53 PM, etc.

Each of these 28 blocks for a given week contains all of the viewing data for a six-hour period either for all sample households and members. Thus, if a system user requested viewing data for a particular member of the sample at a specific time, then the appropriate block of data in DME database 126 will be retrieved from DME database 126 and loaded into memory 120. This block will be the block that contains all the viewing data for a six-hour period (including the requested time) for all members of the sample audience. Alternatively, the broadcast week could have been subdivided into a greater or lesser number of blocks by selecting an alternative size for each of the blocks.

This memory management procedure is consistent with anticipated mode of system use for a typical user. Typically, if a user requests a type of analysis which requires viewing data for a given sample member at a particular time, then the desired analysis will generally also require viewing data for many or most other members of the sample audience for the selected time and for adjacent times. Thus, all necessary data is efficiently loaded as a single block from DME database 126 into memory 120. This is a more efficient process than would otherwise be required using conventional database management systems which repeatedly return to the database file for more data for other sample members or for other times in an iterative fashion.

Figure 6:
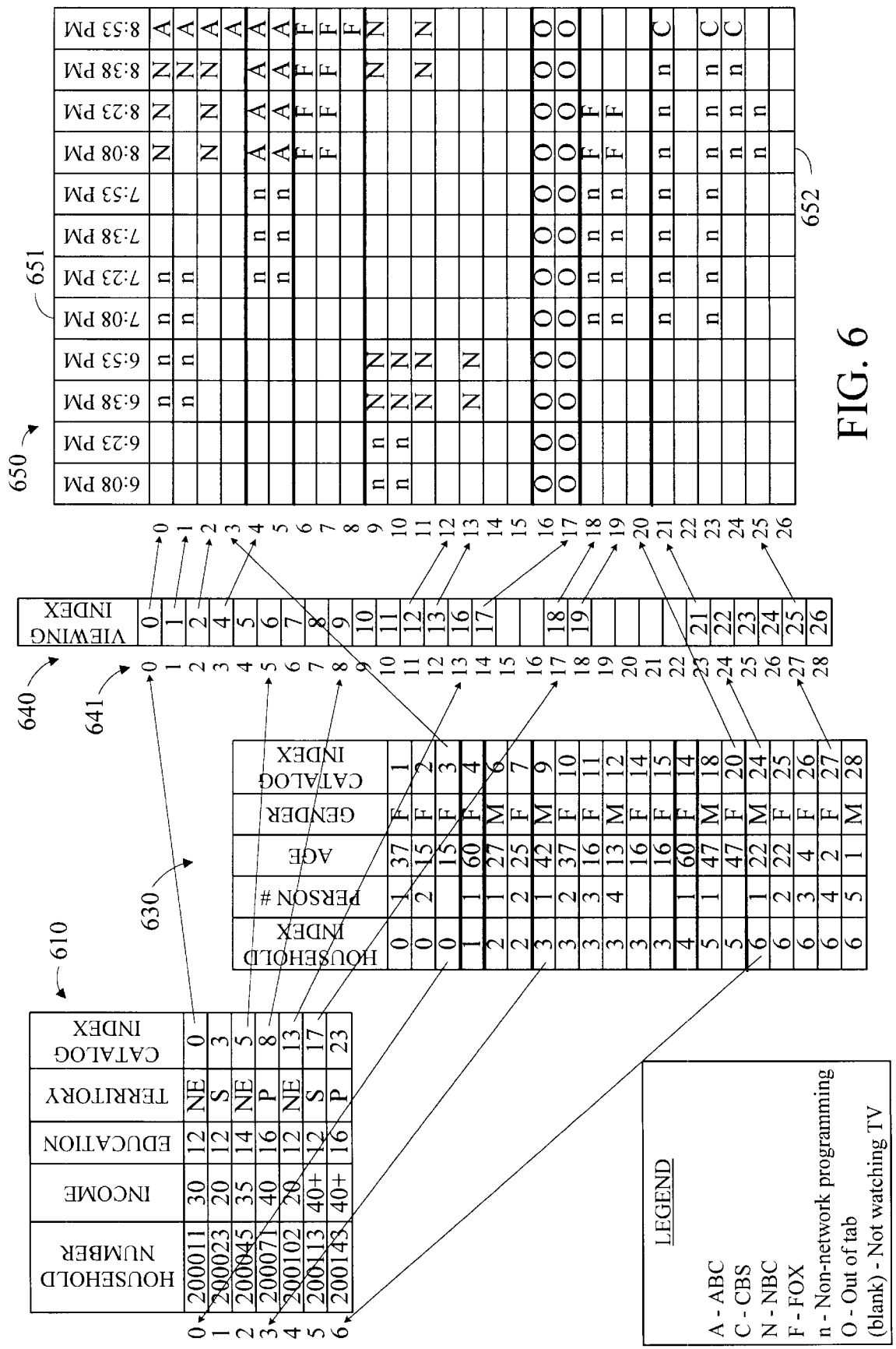
FIG. 6 is detailed graphical representation of a preferred embodiment of the data structure of the .tvd files in the database.

Referring now to FIG. 6, a simplified graphical representation of the data contained in a .tvd file as stored in DME database 126 is shown. The data in FIG. 6 represents a total of 7 households, with 17 members residing in those households, and 3 visitors. The indices in each of the arrays indicate a relationship to the data contained in other arrays, and the viewing status elements in the viewing data arrays are typical for actual members of the sample audience. Although somewhat involved, FIG. 6 presents a useful example of how the actual database arrays relate to each other. Note that in an effort to avoid too much confusion in the figure, not all of the possible relationship arrows are included.

The arrows in FIG. 6 indicate some of these index relationships between various data elements. Normal programming practice in C++ suggests the use of memory pointers rather than indices to relate one object to another. However, as explained above, it is unknown where in memory 120 the allocated blocks will be located after they are retrieved from DME database 126. So, using the various preferred embodiments of the present invention, pointers cannot be used to access database 126. The indices are used in place of pointers to indicate an offset into each block of data.

Each cell 651 in a block of viewing data 650 indicates a television viewing status element for one member of the Nielsen sample, or for one household, for the mid-point of one quarter hour time period 651. If, for a particular record in the viewing data, the person or household is watching one of the viewing options (such as ABC, CBS, Fox, NBC, one of the cable networks, or non-network programming), it is indicated. If the member was not watching television, then cell 651 is blank. Also indicated is whether or not the sample member is out-of-tab (shown in as an "O" in each out-of-tab cell.)

DME database 126 includes a viewing catalog data structure 640 that relates person and household objects to viewing data 650. The data for each household and person includes an index value 641 indicating the position in viewing catalog 640 for that person. So, to retrieve viewing data for one member of the Nielsen sample for a single quarter hour period, DME 127 will perform the following tasks.

First, DME 127 will allocate a block of memory 120 for all person objects for the desired week, and loads all person data objects from disk into the allocated block of memory 120. Next, DME 127 allocates a block of memory 120 for all household objects for the week, and loads all household data objects from disk into memory 120. Then, DME 127 will allocate a block of memory 120 for viewing data 650 and load the desired six-hour block of viewing data 650 into this block of memory 120. Once viewing data 650 is loaded into memory 120, DME 127 will allocate a small block of memory 120 and loads viewing catalog 640 into this block of memory 120. Next, DME 127 will locate the person object in memory 120 for the requested member of the sample and move to the position in the viewing catalog as indicated by the catalog index value in the person object. Then, DME 127 moves to the appropriate record in the viewing data as indicated by the viewing index value in the viewing catalog. Finally, DME 127 can move along the record in viewing data 650 to the desired time during the six hour time block and retrieve the viewing indicator.

For example, to find out what person #4 in household #200143 was watching at 8:23 PM, DME 127 will search through the array of person objects 630 until it finds person #4 in household #200143. In searching for this particular person, the household number of each person is found by reading the household index number, which, in this case, is 6, and then reading the household number for array element number 6 in the household objects array 610. After finding the person, the catalog index number is read, which, in this case is 27. Then, the $27^{th}$ element of viewing catalog 640 is read for the viewing index, which is 25. Next, the $25^{th}$ element in the person viewing data array is accessed. Finally, by referencing the appropriate cell, this element indicates that at 8:23 PM the person was watching non-network television.

There are at least two important reasons for redirecting the viewing data locations through viewing catalog 640 rather than indicating the location of viewing data with viewing data block 650 directly from household objects array 610 and person objects array 630. First of all, by redirecting the data lookup through viewing catalog 640, viewing catalog 640 can remain consistent from one week to the next. "Consistent" in this context means that the various entries in viewing catalog 640 are in the same relative position from week to week. The entry for person #1 in household #200143, for example, is always six positions following the entry in viewing catalog 640 for person #1 in household #200113. Given a consistent viewing catalog 640, it is only necessary to load a single person objects array 630 or one household objects array 610 from a single week in order to retrieve data spanning multiple weeks. The catalog index values in these arrays can be used with a viewing catalog 640 from any week of data. Second, in order to maintain consistency between weeks in viewing catalog 640, when members drop out of the sample, empty space will remain in viewing catalog 640. Viewing catalog 640 is not compressed to eliminate the spaces, as indicated by the empty cells shown in viewing catalog 640 at positions 15, 16, and 19–22. But, because of the indirection in the viewing index, these spaces are not necessary in the viewing data, thus reducing the memory requirements for the data.

DME 127 can also be used to review the viewing habits of person #1 in household #200143 over a period of several weeks. As indicated earlier, for the week shown in FIG. 6, the catalog index number for of person #1 in household #2001432, and the viewing index number is 22. For the week shown in FIG. 6 viewing index number 22 is used to retrieve the viewing information. However, in order to analyze what this same person was watching during the following week, there is no need to load another array of person objects 630 and find the catalog index value for this person for the next week. The catalog index values remain the same for all members of the sample from one week to the next. This person's catalog index value is still 25. So, DME 127 loads viewing catalog 640 for the next week and retrieves the viewing index value from catalog index position 25. This viewing index value may not be 22 as it was in the first week. If there is no viewing index value in viewing catalog 640 at position 25 for the next week, we know that this person was dropped from the sample, and that there is no viewing data contained in viewing data block 650 for the person during that week.

In summary, the use of viewing catalog 640 eliminates two time and memory consuming tasks in retrieving viewing data which spans days or weeks. First, there is no need to load person and household objects for multiple weeks. Second, the need to search through multiple person or household arrays for sample members is also eliminated.

The above described architecture for DME database 126 is not absolutely essential for the implementation of graphical user interface 125. However, because of the significant speed advantages afforded by this structure, it is the most preferred embodiment for storing Nielsen data for use with the present invention. Future advances in computer hardware may make it possible to implement the present invention using conventional database management techniques. However, the specific database design of the present invention will still provide a significant speed advantage over other database structures presently known.

Referring now to FIG. 7, three viewing catalogs 640 for three consecutive weeks are shown (week 1, week 2, and week 3). In the week following that shown in FIG. 6, the first three households (up through household #200045) are dropped from the sample. As shown in FIG. 7, viewing catalog 740 has blank spaces in cells 0–7. There is no viewing data for these households. Therefore, it is no longer necessary to store cells 0–7 in the database, as indicated by the dashed lines in FIG. 7. For week 2, viewing catalog 640 will begin with the cell that corresponds to cell #8 of the previous week, together with the absolute cell position of this first cell. The number of the first valid cell in the viewing catalog is referred to as the catalog offset (in this case, 8).

To extend the example, if households #200071 and #200102 are dropped in week three, then the cells which correspond to cells 0–14 of week 1 will be blank. Recognizing that cells 15, and 16 were already blank, the first valid cell for week three is #17. This is illustrated in FIG. 7 for viewing catalog 640 for week 3. Similarly, only those cells of viewing catalog 640 beginning with cell 17 along with this offset number are stored.

From week to week, the index to viewing data for each sample member is stored in the corresponding cells of viewing catalog 640 as shown in FIG. 7. For example, the catalog index for week 1 for person #3 in household number 200143 is 26, for week 2 it is 18, and for week 3 it is 9. Note that the viewing catalog index values (the numbers down the left hand side of each viewing catalogs 640) change from week to week, but the relative positions of the cells do not.

Using the catalog index for any weeks, along with the appropriate catalog offset values, DME 127 can compute the catalog index value for any week in DME database 126. This capability allows DME 127 to avoid needlessly searching through person object arrays or household object arrays for other weeks that include the sample member of interest. For example, it will be fairly simple to retrieve the viewing data for person #3 in household number 200143 for all of the above weeks. Although any week could be used as the starting point, for illustrative purposes week 2 is selected. In week 2 the catalog index for person #3 in household number 200143 is 18. The catalog index for any other week is a combination of this catalog index and offsets for the two weeks, as calculated below.

Catalog Index $n$=Catalog Index 0+Offset 0−Offset $n$

Therefore, the catalog index value for week 1 is:

Catalog Index 1=18+8−0=26 and for week 3 the catalog index value is:

Catalog Index 3=18+8−17=9

The calculation of the catalog index value can be seen in FIG. 7. Now, using a combination of the viewing catalogs 640 and catalog offsets for several weeks, the viewing information for a selected person in the Nielsen sample can be quickly accumulated. First, the viewing catalog index number for the desired person is retrieved from any one of the weeks of interest. Then, each of the viewing catalogs

640, along with the associated catalog offset for the catalog, is successively loaded for person #3 in household number 200143, along with the viewing data for the associated week. Then, by comparing the catalog offset, the viewing index, and catalog values, one of the following conclusions will be reached. If, for any given week, the calculated catalog index is less than the catalog offset for that week, then the desired person has been dropped from the sample. Additionally, if the location in the viewing catalog for the catalog index plus the catalog offset is blank, then the desired person has been dropped from the sample. Finally, if the calculated catalog index is greater than the size of the viewing catalog, then, for that specific week, the person has not yet been added to the sample.

Most types of analysis dealing with advertising and broadcasting require retrieval of media exposure data for demographically related groups of people, not just individuals as in the example above. For example, it might be desirable to know what people in the 18–49 age group were watching at time 1 during week 1, time 2 during week 2, and at time 3 during week 3. DME database 126 is designed so as to be particularly well suited for these types of queries. This is illustrated in the following pseudo-code shown immediately below.

```
1)  load the person and household objects for week 1
2)  for each of three weeks
       3)  load the viewing catalog
       4)  load the catalog offset
       5)  load the viewing data
6)  next
7)  for each person in week 1
       8)  if this person is in the selected demographic group
       9)  for each week n
              10) calculate the catalog index
              11) retrieve the viewing data for time n
              12) if this person is not in-tab or in the sample
                     13) go to the next person
              14) end if
       15) next
       16) add results to summary values
       17) end if
18) next
19) return the summary values
```

Viewing catalog 640 will not grow indefinitely because viewing catalog index positions are assigned to households and people in the order in which they are added to the Nielsen sample. Therefore, the sequence in which they are dropped from viewing catalog 640 will be in approximate chronological order. The sample members that are most likely to be dropped from the sample are at the top of the catalog index because they have been in the sample the longest.

User Interface

Graphical user interface 125 provides access to DME 127 and, by extension, to DME database 126 via DME 127. There are several unique characteristics available in conjunction with user interface 125 that are especially advantageous for analyzing Nielsen data. Each of these specific features is explained below.

Figure 8:
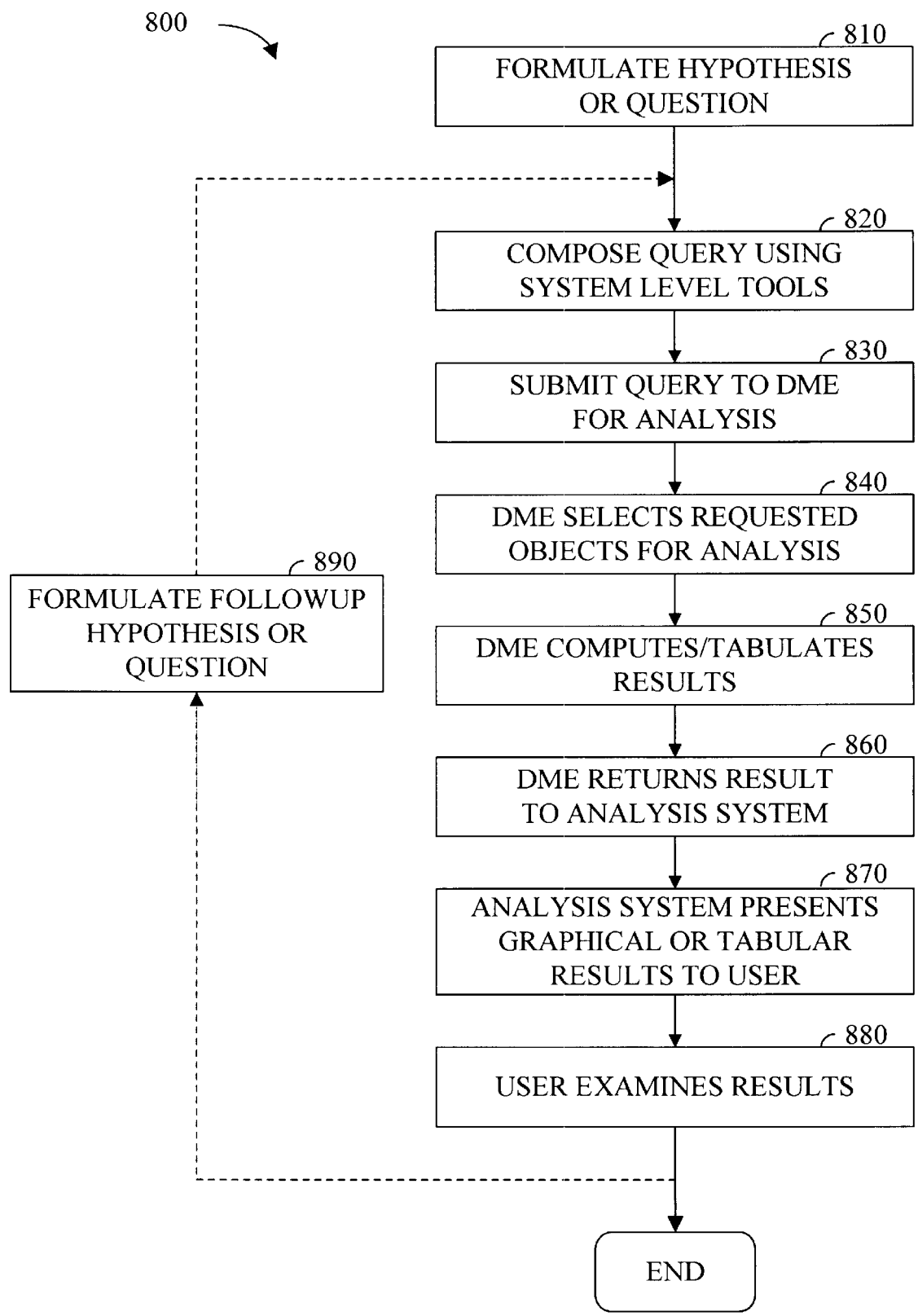
FIG. 8 is a flowchart of a method 800 for using a graphical user interface to analyze the records in the database using a preferred embodiment of the present invention.

Referring now to FIG. 8, a method 800 for using a preferred embodiment of the present invention to access the television viewing data is described. System users can gain insight into how audiences make television viewing decisions by using the system to interactively browse through the viewing data. To use the system, a person typically iterates through the steps illustrated in FIG. 8. The user formulates a question or hypothesis about audience viewing behavior (step 810). The user composes a query based on the question or hypothesis using graphical tools supplied user interface 125 (step 820). The user submits the query to the DBMS (step 830). DME 127 selects a subset of the audience sample based on demographic choices the user made in composing the query (step 840). DME 127 computes/tabulates the results (step 850) and returns the results to system 100 (step 860). Then, user interface 125 of system 100 presents the query results in graphical and/or tabular form to the user (step 870). The user then examines the results, and in doing so, may formulate new questions or hypotheses about viewing patterns and decisions (step 890). In this case and based on these new hypotheses, the user may return to step 810 to compose one or more new queries.

Referring now to FIG. 9, sample cross tabulation information for the hit television program "Friends" is shown. This type of graphical presentation for media-related data is not readily available for general use in the market today. Typically, this type of information is only available by contacting organizations that specialize in producing it. However, with the various preferred embodiments of the present invention, this type of information can be made readily available to a large audience.

Another feature of graphic user interface 125 is the ease of selecting desired demographic information. Demographic groups can be selected by adjusting the length and position of a series of graphical bars, in which the position of each bar represents the selected range for a single demographic attribute. The user clicks on the numerical values indicating the selected range of values. The bar position is adjusted to reflect this selection. In addition, a user of system 100 can immediately access a variety of useful media-related person-by-person information by merely clicking on a single icon.

Similarly, referring now to FIG. 10, a user may "click" a mouse on the defection icon and generate the line graph shown in FIG. 11. The icon-driven graphical user interface 125 provides single click access to very sophisticated types of information.

Figure 12:
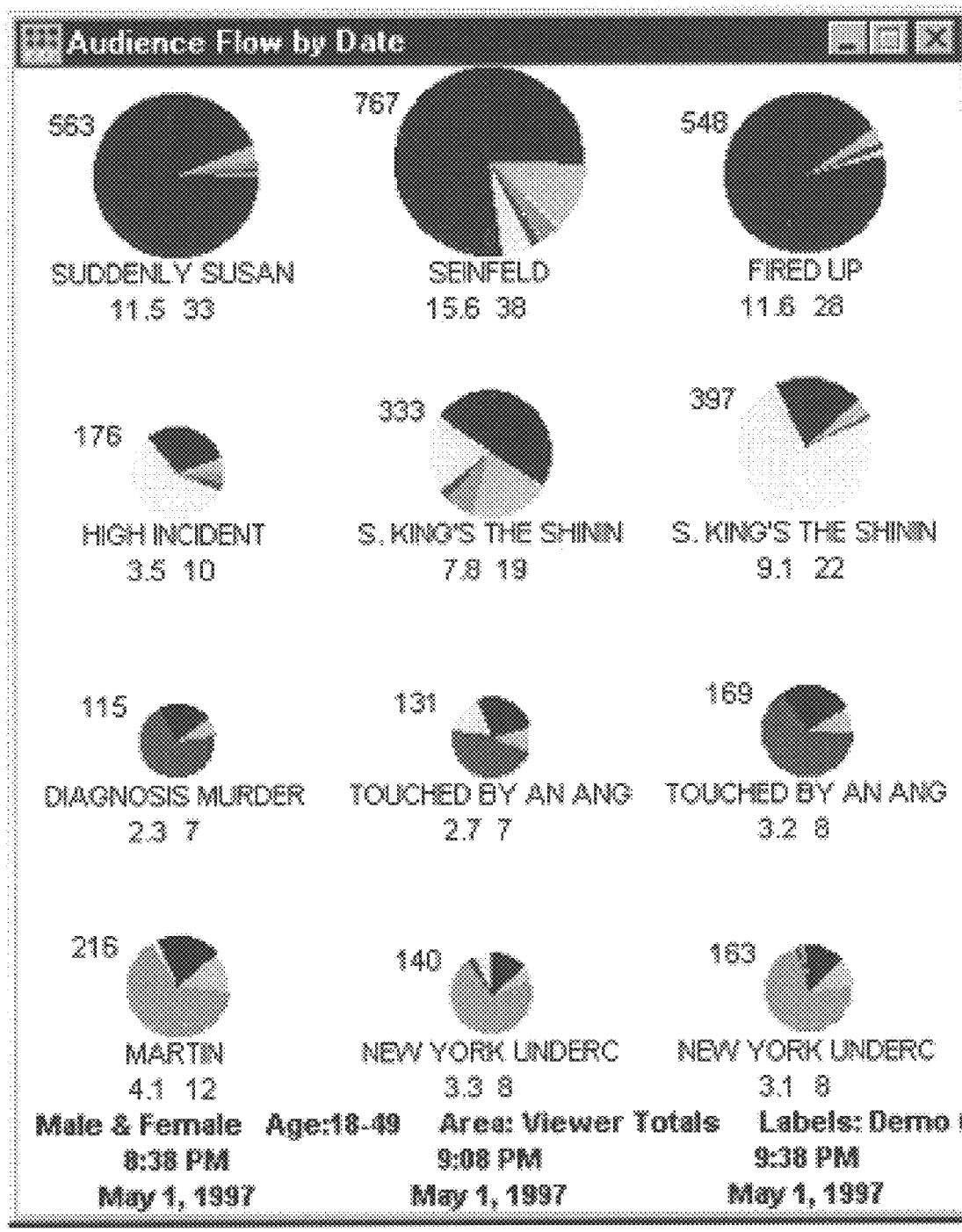
FIG. 12 is screen shot of a pie chart representing data contained in a database file according to a preferred embodiment of the present invention.

Anywhere on any screen where a program names or data is displayed, the user may retrieve more detailed information on a given program by selecting the program name or data region using the mouse. For example, the pie chart shown in FIG. 12 represents audience flow for a series of programs, then the user may select any one of the titles to show other information about that episode of the program such as total ratings, or share. Alternatively, if a user selects a program as described above, the system could be configured to display historical ratings trends. Finally, the user can customize the system to determine that information that is displayed when the user selects an item. Some useful items that can be accessed via user interface 125 are explained briefly below.

Program Lists. Using a variety of interactive mechanisms, a user can assemble lists of program episodes. Analysis can then be performed on these lists.

Program Schedule Data Dynamics. A user can select a program schedule for display, and then select other data elements for display in the context of the schedule. The user can, for example, select for display the programming schedule for NBC for all Monday evenings between two dates. The user then could select for display adjacent to the name of each of the programs the retention or lead-in value for the program.

A computer system 100 for data manipulation and analysis in accordance with a preferred embodiment of the present invention employs a unique user interface 125 which, in conjunction with DME 127, can retrieve the Nielsen data from DME database 126 and then present the data in graphical and tabular forms to system users. The various embodiments of user interface 125 are designed to be easy to use and intuitively simple. This allows broadcasting and advertising professionals to understand the viewing patterns of the television audience with little or no formal training.

System users are often interested in the television viewing behavior of particular demographic groups. They may, for example, be interested only in adults in the age range of 18 to 49 years old who live in the northeast United States, and who live in households with incomes greater than $40,000 per year. The data analysis system of the present invention is designed to provide convenient isolation of these types of demographic groups in the sample, and the necessary tools for analyzing their viewing habits.

The techniques described can be used in a variety of environments. We have discussed applying them to broadcasting applications, but they are equally effective in being applied to point-cast and multi-cast applications such as over the Internet, and cable systems. All that is required is exposure data and processing time. The ability to gather exposure data will only improve as electronic media becomes more popular. It is likely that data for larger sample sizes will be available, the data will be cheaper to accumulate, and more data will be available. This would suggest the need for better mechanisms for analyzing the data as described herein.

While the invention has been particularly shown and described with reference to preferred embodiments thereof, it will be understood by those skilled in the art that various changes in form and details may be made therein without departing from the spirit and scope of the invention. Accordingly, the invention should not be limited to the specific embodiments shown herein.

I claim:

1. A computer system for manipulating and analyzing data, the system comprising:
   a CPU;
   a memory coupled to the CPU;
   a database residing in the memory, the database comprising a plurality of person-by-person records which describe a series of choices and decisions made by an identified sample audience in relation to a media vehicle, and wherein the database comprises a plurality of portions, with each of the plurality of portions including person-by-person records corresponding to a different time period and wherein the each of the plurality of portions includes a viewing index that indexes the person-by-person records for the corresponding time period;
   a database mining engine residing in the memory, the database mining engine utilizing the plurality of viewing indices to selectively retrieve data from the database; and
   a graphical user interface residing in the memory and being executed by the CPU, wherein the user interface accesses the person-by-person records in the database via the database mining engine.

2. The computer system of claim 1 wherein the graphical user interface comprises a plurality of icons which utilize the database mining engine to select and retrieve data from the person-by-person records in the database.

3. The computer system of claim 1 wherein the media vehicle is television.

4. The computer system of claim 1 wherein the database mining engine further comprises a plurality of Boolean filters used to screen the plurality of person-by-person records contained in the database.

5. The computer system of claim 1 further comprising a data conversion mechanism that comprises a mechanism for converting data from a first data format to a second data format and wherein the first data format comprises a plurality of television viewing records received from A. C. Nielsen and the second data format comprises a data representation where selected data fields are represented as a sequence of bits, with each of the sequence of bits corresponding to one data possibility and wherein one of the sequence of bits is set to indicate which of the data possibilities the field includes, and wherein the selected data can be selectively retrieved using a boolean operation with a boolean filter, wherein the boolean filter includes a sequence of bits with at least one bit set to select at least one of the data possibilities in the selected data fields.

6. The computer system of claim 5 wherein the selected data fields include person ages, and wherein each of the sequence of bits represents a range of ages.

7. The computer system of claim 5 wherein the selected data fields include household income, and wherein each of the sequence of bits represents a range of household income.

8. The computer system of claim 1 wherein each of the plurality of viewing indices includes an offset value indicating the offset of the person-by-person records in the corresponding portions relative to a portion for a previous time period.

9. The computer system of claim 1 wherein each of the plurality of viewing indices includes a plurality of cells, wherein each of the plurality of cells corresponds to a person in the database and wherein each of the plurality of cells includes a catalog index that indicates the location into the person-by-person records for the corresponding person.

10. The computer system of claim 9 wherein each of the plurality of viewing indices includes a viewing index offset value that indicates the relative offset of the catalog indices relative to a previous time period such that the person-by-person records of a person can be located using the relative location of a cell for the person for a previous time period and the viewing index offset value.

11. The computer system of claim 9 wherein the data base includes an array of person objects, and wherein each of the array of person objects includes fields representing the age and gender of the corresponding person, and wherein each of the array of person objects includes a catalog index value indicating the relative location of the corresponding persons cell in the viewing index.

12. The computer system of claim 11 wherein the fields representing the age of the corresponding person each includes a sequence of bits, with each bit assigned to correspond to one of a plurality of age ranges and wherein the bit corresponding to the age range of a corresponding person is set, such that the data mining engine can quickly retrieve viewing data from persons of one or more selected age ranges by utilizing a boolean operation with a boolean filter having a corresponding sequence of bits with each bit corresponding to a selected age range having been set.

13. A computer system for manipulating and analyzing a plurality of media-related person-by-person data files, the system comprising:
   a CPU;
   a memory coupled to the CPU;
   a database residing in the memory, the database containing the plurality of person-by-person data files, the plurality of person-by-person data files containing data which has been converted from data supplied by A. C. Nielsen, and wherein the database comprises a plurality of portions, with each of the plurality of portions including person-by-person records corresponding to a different time period and wherein the each of the plurality of portions includes a viewing index that indexes the person-by-person records for the corresponding time period, wherein each of the plurality of viewing indices includes a plurality of cells, wherein each of the plurality of cells corresponds to a person in the database and wherein each of the plurality of cells includes a catalog index that indicates the location into the person-by-person records for the corresponding person;

a database mining engine residing in the memory, the database mining engine utilizing the plurality of viewing indices to selectively retrieve data from the database;

a data conversion mechanism residing in the memory, the data conversion mechanism comprising a mechanism for converting data from A. C. Neilson format to a memory image representation of the plurality of television viewing records; and a graphical user interface residing in the memory and being executed by the CPU, wherein the graphical user interface accesses the plurality of person-by-person data files via the database mining engine.

14. The computer system of claim 13 wherein the data base includes an array of person objects for each time period, and wherein each of the person objects includes fields representing the age and gender of the corresponding person, and wherein each of the person objects includes a catalog index value indicating the relative location of the corresponding persons cell in the viewing index, and wherein each field representing the age of the corresponding person includes a sequence of bits, with each bit assigned to correspond to one of a plurality of age ranges and wherein the bit corresponding to the age range of the corresponding person is set, such that the data mining engine can quickly retrieve viewing data from persons of one or more selected age ranges by utilizing a boolean operation with a boolean filter having a corresponding sequence of bits with each bit corresponding to a selected age range.

15. A program product comprising:

an audience database comprising a plurality of person-by-person records which describe a series of choices and decisions made by an identified sample audience in relation to a media vehicle, and wherein the database comprises a plurality of portions, with each of the plurality of portions including person-by-person records corresponding to a different time period and wherein the each of the plurality of portions includes a viewing index that indexes the person-by-person records for the corresponding time period;

a database mining engine accessible through a graphical user interface wherein the database mining engine accesses a plurality of media-related person-by-person data records and provides at least one response containing information selected from a subset of the plurality of media-related person-by-person data records; and signal bearing media bearing the audience database and database mining engine.

16. The program product of claim 15 wherein the signal bearing media comprises transmission media.

17. The program product of claim 15 wherein the signal bearing media comprises recordable media.

18. The program product of claim 15 further comprising a data conversion mechanism, the data conversion mechanism comprising a mechanism comprising a mechanism for converting data from a first data format to a second data format and wherein the first data format comprises a plurality of television viewing records received from A. C. Nielsen and the second data format comprises a data representation where selected data fields are represented as a sequence of bits, with each of the sequence of bits corresponding to one data possibility and wherein one of the sequence of bits is set to indicate which of the data possibilities the field includes, and wherein the selected data can be selectively retrieved using a boolean operation with a boolean filter, wherein the boolean filter includes a sequence of bits with at least one bit set to select at least one of the data possibilities in the selected data fields.

19. The program product of claim 18 wherein the selected data comprises person ages, and wherein each of the sequence of bits represents a range of ages.

20. The program product of claim 18 wherein the selected data fields include household income, and wherein each of the sequence of bits represents a range of household income.

21. The program product of claim 15 wherein each of the plurality of viewing indices includes a plurality of cells, wherein each of the plurality of cells corresponds to a person in the database and wherein each of the plurality of cells includes a catalog index that indicates the location into the person-by-person records for the corresponding person.

22. The program product of claim 21 wherein each of the plurality of viewing indices includes a viewing index offset value that indicates the relative offset of the catalog indices relative to a previous time period such that the person-by-person records of a person can be located using the relative location of a cell for the person for a previous time period and the viewing index offset value.

23. A computer implemented method for converting data from a first format to a second data format, the method comprising the steps of:

inputting a data file into a computer system from a source;

reading a plurality of person-by-person media-related data records, each record comprising at least one data element, from the data file;

processing the plurality of person-by-person media-related data records by converting each of the at least one data elements to sequence of bits, where each of the sequence of bits corresponds to a data element possibility, wherein one of the sequence of bits is set to indicate which of the data possibilities the at least one data element includes, and wherein the selected data can be selectively retrieving using a boolean operation with a boolean filter, wherein the boolean filter includes a sequence of bits with at least one bit set to select at least one of the data possibilities in the at least one data element;

writing the processed person-by-person media-related data records to a file.

24. The method of claim 23 wherein the source comprises television viewing data.

25. A computer-implemented method of filtering a database containing person-by-person media-related records, the method comprising the steps of:

providing a plurality of fields in each of the person-by-person media related records, each of the plurality of fields including a sequence of bits, where each bit represents one of a plurality of data possibilities;

using a graphical user interface to identify a first desired demographic characteristic;

using a graphical user interface to identify a second desired demographic characteristic; and using a plurality of bit masks to select a subset of the person-by-person media-related records according to the first and second desired demographic characteristic, each of the bit masks comprising a sequence of bits corresponding to the sequence of bits in one of the plurality of fields, and wherein one or more bits corresponding to the first and second desired demographic characteristic are set to select a subset of the person-by person media related records.

26. The method of claim 25 wherein the first desired demographic characteristic is related to gender and wherein the second desired demographic characteristic is related to age.

27. The method of claim 25 wherein the first desired demographic characteristic is related to education and wherein the second desired demographic characteristic is related to income.

28. A method of filtering a database containing media-related person-by-person records, the method comprising the step of using at least one bit mask to select a subset of the media-related person-by-person records, wherein the bit mask represents a desired demographic characteristic in a sequence of bits with each of the sequence of bits representing one subset of the desired demographic characteristic.

29. The method of claim 28 wherein the step of using at least one bit mask to select a subset of the media-related person-by-person records comprises the step of using a age filter mask to select a subset of the media-related person-by-person records according to an age-related criteria.

30. The method of claim 28 wherein the step of using at least one bit mask to select a subset of the media-related person-by-person records comprises the step of using an education filter mask to select a subset of the media-related person-by-person records according to an education level criteria.

* * * * *